(12) United States Patent
Takahashi

(10) Patent No.: US 11,420,402 B2
(45) Date of Patent: Aug. 23, 2022

(54) TIRE PUNCTURE SEALING AGENT AND TIRE PUNCTURE REPAIR KIT

(71) Applicant: THE YOKOHAMA RUBBER CO., LTD., Tokyo (JP)

(72) Inventor: Kiyohito Takahashi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 782 days.

(21) Appl. No.: 15/999,244

(22) PCT Filed: Feb. 17, 2017

(86) PCT No.: PCT/JP2017/005938
§ 371 (c)(1),
(2) Date: Aug. 17, 2018

(87) PCT Pub. No.: WO2017/142067
PCT Pub. Date: Aug. 24, 2017

(65) Prior Publication Data
US 2019/0105858 A1 Apr. 11, 2019

(30) Foreign Application Priority Data

Feb. 17, 2016 (JP) .............................. JP2016-027555

(51) Int. Cl.
*B29C 73/16* (2006.01)
*C09K 3/10* (2006.01)
*C08K 5/06* (2006.01)
*C08L 21/02* (2006.01)
*C08L 71/02* (2006.01)

(52) U.S. Cl.
CPC .............. *B29C 73/163* (2013.01); *C08K 5/06* (2013.01); *C08L 21/02* (2013.01); *C08L 71/02* (2013.01); *C09K 3/10* (2013.01)

(58) Field of Classification Search
CPC ......... B29C 73/163; C08K 5/06; C08L 71/02; C09L 21/02; C09K 3/10
See application file for complete search history.

(56) References Cited

U.S. PATENT DOCUMENTS

| 2010/0331449 A1* | 12/2010 | Ishida | ................... B29C 73/163 |
|---|---|---|---|
| | | | 523/166 |
| 2011/0201722 A1 | 8/2011 | Takahara et al. | |
| 2017/0066206 A1* | 3/2017 | Takahara | ........... C09J 123/0853 |

FOREIGN PATENT DOCUMENTS

| JP | 2010-001394 A | 1/2010 |
|---|---|---|
| JP | 2011-012160 A | 1/2011 |
| JP | 2015-168706 A | 9/2015 |
| WO | 2015/133519 A1 | 9/2015 |

OTHER PUBLICATIONS

Extended European search report issued in corresponding patent application No. EP 17753322.1 dated Oct. 9, 2019.

* cited by examiner

*Primary Examiner* — Edward J Cain
(74) *Attorney, Agent, or Firm* — Carrier Blackman & Associates, P.C.; William D. Blackman; Joseph P. Carrier

(57) ABSTRACT

The present invention provides a tire puncture sealing agent having excellent storage performance, and a tire puncture repair kit. The tire puncture sealing agent of the present invention contains: a rubber latex and/or a resin emulsion; a predetermined glycol ether; and a non-ionic surfactant having an HLB value from 15 to 20.

10 Claims, No Drawings

TIRE PUNCTURE SEALING AGENT AND TIRE PUNCTURE REPAIR KIT

TECHNICAL FIELD

The present invention relates to a tire puncture sealing agent and a tire puncture repair kit.

BACKGROUND ART

Patent Document 1 describes a "tire puncture sealing agent containing: a rubber latex and/or a resin emulsion; a glycol ether represented by Formula (1) described below; and a surfactant:

$$H_3C-O+(CH_2CH_2O)_p-R_1 \quad (1)$$

(where $R_1$ represents a hydrogen atom or an alkyl group; and p represents an integer of 1 or greater)".

CITATION LIST

Patent Document

Patent Document 1: JP 2015-168706 A

SUMMARY OF INVENTION

Technical Problem

The present inventor has studied the tire puncture sealing agent disclosed in Patent Document 1, and has found that there is room for further enhancement in storage performance, in other words, an estimated usable period of a tire puncture sealing agent stored under certain conditions.

Thus, a technical problem to be solved by the present invention is to provide a tire puncture sealing agent having excellent storage performance, and a tire puncture repair kit.

Solution to Problem

As a result of dedicated study to solve the above-described technical problem, the present inventor has found that a tire puncture sealing agent containing a rubber latex and/or a resin emulsion; a predetermined glycol ether; and a non-ionic surfactant having an HLB value from 15 to 20 has excellent storage performance, and completed the present invention.

In other words, the present inventor has found that the above-described technical problem can be solved by the following configurations.

[1] A tire puncture sealing agent containing: at least any of a rubber latex and a resin emulsion; a glycol ether represented by Formula (A) described below; and a non-ionic surfactant having an HLB value from 15 to 20.

[2] The tire puncture sealing agent according to [1], wherein the non-ionic surfactant is represented by Formula (B) described below.

[3] The tire puncture sealing agent according to [2], wherein, in Formula (B) described below, $R^3$ has from 8 to 20 carbon atoms.

[4] The tire puncture sealing agent according to any of [1] to [3], wherein the tire puncture sealing agent contains from 1 to 60 parts by mass of the non-ionic surfactant per total 100 parts by mass of a solid content of the rubber latex and a solid content of the resin emulsion.

[5] The tire puncture sealing agent according to any of [1] to [4], wherein, in Formula (A) described below, $R^1$ has 1 carbon atom.

[6] A tire puncture repair kit including the tire puncture sealing agent according to any of [1] to [5].

Advantageous Effects of Invention

According to the present invention, it is possible to provide a tire puncture sealing agent having excellent storage performance, and a tire puncture repair kit.

DESCRIPTION OF EMBODIMENTS

The present invention will be described below in detail. Elements described below may be described on the basis of representative embodiments of the present invention; however, the present invention is not limited to such embodiments.

Note that herein, the numerical range indicated by using "(from) . . . to . . . " include the former value as a lower limit value and the latter value as an upper limit value.

Tire Puncture Sealing Agent

A tire puncture sealing agent of the present invention contains: a rubber latex and/or a resin emulsion; a glycol ether represented by Formula (A) described below; and a non-ionic surfactant having an HLB value from 15 to 20. The tire puncture sealing agent of the present invention including such a configuration has excellent storage performance.

While the reasons for this are not clear, the present inventor deduces as follows.

The tire puncture sealing agent of the present invention contains at least any of a rubber latex and a resin emulsion (also referred to as a "rubber latex and/or a resin emulsion" below). A "latex" refers to an aqueous dispersion of rubber particles. Prior to use, the tire puncture sealing agent of the present invention includes rubber particles and/or a resin dispersed in a liquid. Note that the rubber particles and/or the resin dispersed in the tire puncture sealing agent are also referred to as "dispersed particles" below. The tire puncture sealing agent is injected into a tire by a method described below, and the tire is simultaneously or subsequently filled with a high-pressure gas such as air, and subsequently the tire is rotated. It is deduced that when no hole causing puncture of a tire (also referred to as a "puncture hole" below) is present, no significant physical or chemical change occurs in the dispersed particles in the tire puncture sealing agent. However, when a puncture hole is present, rotation of a tire causes the tire puncture sealing agent to spread in the tire, and a portion of the tire puncture sealing agent located at or near the puncture hole is sucked into the puncture hole due to an air pressure differential between an inside and an outside of the tire, and receives large shear force. At least a portion of the dispersed particles irreversibly solidifies by such shear force, and closes the puncture hole, in other words, seals the puncture hole. The dispersed particles are stably present in the liquid, but solidify by receiving shear force as described above, and thus, the tire puncture sealing agent of the present invention exhibits excellent sealing properties.

To ensure sufficient freeze resistance for enabling use in a cold region, the tire puncture sealing agent of the present invention contains a specific glycol ether. Since the glycol ether has a low freezing point, the tire puncture sealing agent of the present invention has excellent freeze resistance. However, the glycol ether may destabilize a dispersion state of the rubber latex and/or the resin emulsion. As a result of dedicated study, the present inventor has successfully developed the tire puncture sealing agent containing the non-ionic surfactant having an HLB value in a predetermined range, and accordingly, maintaining excellent sealing properties and freeze resistance and further stabilizing the dispersed particles in the liquid to result in having excellent storage performance, and completed the present invention.

Rubber Latex and/or Resin Emulsion

The tire puncture sealing agent of the present invention contains the rubber latex and/or the resin emulsion.

In the present invention, any one or both of the rubber latex and the resin emulsion can be used, and in view of improving sealing properties, both the rubber latex and the resin emulsion are preferably used.

A total content of the rubber latex and the resin emulsion in the tire puncture sealing agent of the present invention is not particularly limited, but in view of further improving sealing properties and injectability into a tire, the total content of the rubber latex and the resin emulsion is preferably from 30 to 80 mass % with respect to a total of the tire puncture sealing agent. Additionally, a total content of a solid content of the rubber latex and a solid content of the resin emulsion is not particularly limited, but in view of further improving sealing properties and injectability into a tire, the total content of the solid content of the rubber latex and the solid content of the resin emulsion is preferably from 10 to 50 mass % with respect to a total of the tire puncture sealing agent.

When both the rubber latex and the resin emulsion are used, a mass ratio of the solid content of the rubber latex to the solid content of the resin emulsion (mass of the solid content of the rubber latex/mass of the solid content of the resin emulsion) is preferably from 10/90 to 90/10, more preferably from 40/60 to 60/40, in view of further improving sealing properties.

Rubber Latex

The rubber latex is not particularly limited, and examples of the rubber latex include a natural rubber latex, a chloroprene latex, a styrene-butadiene rubber latex, an acrylonitrile butadiene rubber latex, and a styrene-butadiene acrylic rubber latex. In particular, a natural rubber latex is preferable, in view of easy irreversible solidification of a natural rubber latex by small shear force.

In the tire puncture sealing agent of the present invention, one type of the rubber latex can be used alone, or two or more types thereof can be used in combination.

Natural Rubber Latex

The natural rubber latex is not particularly limited, and examples of the natural rubber latex include a latex harvested from a *Hevea brasiliensis* tree by tapping, and a deproteinized natural rubber latex obtained by removing a protein from a natural rubber latex. Deproteinization is known to tend to stabilize a dispersion state of a natural rubber latex, and examples of such a deproteinized natural rubber latex include a deproteinized natural rubber latex (SeLatex series; available from SRI Hybrid Ltd.), a deproteinized natural rubber latex (HA; available from Nomura Trading Co., Ltd.), and an ultra-low ammonia natural rubber latex (ULACOL; available from Regitex Co., Ltd.). One type of the natural rubber latex may be used alone, or two or more types thereof may be used in combination.

A content of a solid content in the rubber latex is not particularly limited, but the content of the solid content is preferably from 40 to 80 mass % with respect to a total of the rubber latex.

Resin Emulsion

The resin emulsion is not particularly limited, and a known resin emulsion can be used. In particular, a synthetic resin emulsion is preferable. The resin emulsion is an emulsion including a resin dispersed as a dispersoid in a dispersion medium such as water. In this case, a phase of the resin as a dispersoid may be a liquid phase or a solid phase. Note that herein, an "emulsion" collectively refers to an "emulsion" including a liquid-phase dispersoid dispersed in a liquid-phase dispersion medium, and a "suspension" including a solid-phase dispersoid dispersed in a liquid-phase dispersion medium.

Specific examples of the synthetic resin emulsion include a urethane emulsion, an acrylic emulsion, a polyolefin emulsion, an ethylene-vinyl acetate copolymer emulsion, a polyvinyl acetate emulsion, an ethylene-vinyl acetate-vinyl versatate copolymer emulsion, and a polyvinyl chloride emulsion. One type of the synthetic resin emulsion may be used alone, or two or more types thereof may be used in combination. In particular, the synthetic resin emulsion is preferably an ethylene-vinyl acetate copolymer emulsion or an ethylene-vinyl acetate-vinyl versatate copolymer emulsion, and more preferably an ethylene-vinyl acetate-vinyl versatate copolymer emulsion, in view of further improving sealing properties and storage performance.

The ethylene-vinyl acetate-vinyl versatate copolymer (also referred to as a "VEVA" below) emulsion is not particularly limited as long as the VEVA emulsion is an emulsion of a copolymer including repeating units based on ethylene, vinyl acetate, and vinyl versatate (ester of versatic acid and vinyl alcohol). A method of producing the VEVA emulsion is not particularly limited, and for example, the VEVA emulsion can be obtained by mixing with stirring, and emulsion polymerizing a polymerization initiator and ethylene, vinyl acetate, and vinyl versatate monomers at a necessary ratio in water with use of an emulsifier such as polyvinyl alcohol as a protective colloid. Additionally, other monomers may be copolymerized as necessary. Examples of the other monomers include acrylate ester such as 2-ethylhexyl acrylate, butyl acrylate, and ethyl acrylate; methacrylate ester such as methyl methacrylate and butyl methacrylate; and acrylic acid and methacrylic acid.

In view of further improving sealing properties, as for a content of each repeating unit constituting the copolymer, the VEVA preferably contains from 10 to 40 mass % of an ethylene-based repeating unit, from 10 to 40 mass % of a vinyl acetate-based repeating unit, and from 30 to 70 mass % of a vinyl versatate-based repeating unit, more preferably from 15 to 35 mass % of an ethylene-based repeating unit, from 15 to 35 mass % of a vinyl acetate-based repeating unit, and from 40 to 60 mass % of a vinyl versatate-based repeating unit. Examples of such a VEVA include Sumikaflex 950HQ and Sumikaflex 951HQ (both available from Sumitomo Chemical Co., Ltd.).

One type of the resin emulsion may be used alone, or two or more thereof may be used in combination. A content of a solid content in the resin emulsion is not particularly limited, but the content of the solid content is preferably from 30 to 70 mass % with respect to a total of the resin emulsion.

Glycol Ether

The tire puncture sealing agent of the present invention contains the glycol ether represented by Formula (A) described below.

$$R^1\text{—O—}(CH_2CH_2O)_n\text{—}R^2 \quad (A)$$

In Formula (A) described above, $R^1$ represents a monovalent aliphatic hydrocarbon group having from 1 to 5 carbon atoms. The monovalent hydrocarbon group having from 1 to 5 carbon atoms is not particularly limited, but examples of the monovalent hydrocarbon group having from 1 to 5 carbon atoms include an alkyl group such as a methyl group, an ethyl group, a propyl group, an isopropyl group, an n-butyl group, a t-butyl group, and a pentyl group; and an alkenyl group such as a vinyl group, an allyl group, a butene group, and a pentene group. In particular, a hydrocarbon group having from 1 to 3 carbon atoms is preferable, and a hydrocarbon group having 1 carbon atom is more preferable.

In Formula (A) described above, $R^2$ represents a hydrogen atom or an alkyl group. In particular, $R^2$ is preferably a hydrogen atom. The alkyl group may be straight-chained, branched, or cyclic, but is preferably straight-chained. The number of carbon atoms of the alkyl group is not particularly limited, but the alkyl group preferably has from 1 to 5 carbon atoms, and more preferably from 1 to 3 carbon atoms.

In Formula (A) described above, n is an integer from 1 to 5. In particular, n is preferably an integer from 1 to 3.

Specific examples of the glycol ether include ethylene glycol monomethyl ether (methyl glycol, MG), diethylene glycol monomethyl ether (methyl diglycol, MDG), triethylene glycol monomethyl ether (methyl triglycol, MTG), ethylene glycol monoisopropyl ether (isopropyl glycol, iPG), diethylene glycol monoisopropyl ether (isopropyldiglycol, iPDG), ethylene glycol monobutyl ether (butyl glycol, BG), diethylene glycol monobutyl ether (butyldiglycol, BDG), triethylene glycol monobutyl ether (butyltriglycol, BTG), ethylene glycol monoisobutyl ether (isobutyl glycol, iBG), diethylene glycol monoisobutyl ether (isobutyldiglycol, iBDG), ethylene glycol mono-tert-butyl ether (tert-butyl cellosolve), ethylene glycol monovinyl ether (2-hydroxyethyl vinyl ether, HEVE), diethylene glycol monovinyl ether (DEGV), ethylene glycol monoallyl ether (allyl glycol, AG), ethylene glycol dimethyl ether (dimethyl glycol, DMG), diethylene glycol dimethyl ether (dimethyldiglycol, DMDG), triethylene glycol dimethyl ether (dimethyltriglycol, DMTG), diethylene glycolmethyl ethyl ether (methyl ethyldiglycol, MEDG), diethylene glycol diethyl ether (diethyl diglycol, DEDG), and diethylene glycol dibutyl ether (dibutyldiglycol, DBDG). In particular, in view of low viscosity and a low freezing point leading to further improvement in freeze resistance and injectability, diethylene glycol monomethyl ether (MDG), triethylene glycol monomethyl ether (MTG), triethylene glycol monobutyl ether (BTG), or diethylene glycol dibutyl ether (DBDG) is preferable. In view of further improving storage performance, ethylene glycol monomethyl ether (methyl glycol, MG), diethylene glycol monomethyl ether (MDG), or triethylene glycol monomethyl ether (MTG) in which $R^1$ in Formula (A) described above has 1 carbon atom is more preferable.

A content of the glycol ether in the tire puncture sealing agent of the present invention is not particularly limited, but in view of further improving freeze resistance and injectability into a tire, the content of the glycol ether is preferably from 10 to 700 parts by mass, more preferably from 25 to 600 parts by mass, even more preferably from 50 to 300 parts by mass, particularly preferably from 70 to 300 parts by mass, and most preferably from 100 to 300 parts by mass per total 100 parts by mass of the solid content of the rubber latex and the solid content of the resin emulsion.

Non-Ionic Surfactant

The tire puncture sealing agent of the present invention contains the non-ionic surfactant having an HLB value from 15 to 20. The HLB value refers to hydrophile-lipophile balance, and is a value indicating a degree of hydrophilicity or lipophilicity of a compound. As the HLB value decreases, lipophilicity increases, and as the value increases, hydrophilicity increases. Herein, the HLB value refers to an HLB value as determined according to Griffin's method. The HLB value according to Griffin's method can be determined by the following formula:

HLB value=20×formula weight of hydrophilic moiety of surfactant/molecular weight of surfactant.   Formula Herein, the surfactant hydrophilic moiety refers, for example, to an ethyleneoxy site, a propyleneoxy site, a polyhydric alcohol site (glycol, glycerin, glycoside, sorbitan, mannitol, or sorbitol), or the like.

The HLB value of the non-ionic surfactant is from 15 to 20. When the HLB value is less than the lower limit value, storage performance is poor. In view of further improving storage performance, the HLB value of the non-ionic surfactant is preferably from 17 to 20, more preferably 18 to 20.

Examples of the non-ionic surfactant include: a non-ionic surfactant of an ester type such as glycerin fatty acid ester, sorbitan fatty acid ester, and sucrose fatty acid ester; a non-ionic surfactant of an ether type such as polyoxyethylene alkyl ether and polyoxyethylene polyoxypropylene glycol; a non-ionic surfactant of an ester ether type such as fatty acid polyethylene glycol and fatty acid polyoxyethylene sorbitan; and a non-ionic surfactant of an alkanolamide type such as fatty acid alkanolamide. In particular, in view of further improving storage performance, the ether type is preferable, and polyoxyethylene alkyl ether described below is more preferable.

One type of the non-ionic surfactant can be used alone, or two or more types thereof can be used in combination.

Polyoxyethylene Alkyl Ether

An example of the polyoxyethylene alkyl ether is a polyoxyethylene alkyl ether represented by Formula (B) described below.

$$R^3-O-(CH_2CH_2O)_m-H \quad (B)$$

In Formula (B) described above, $R^3$ represents a monovalent aliphatic hydrocarbon group. In particular, in view of the tire puncture sealing agent having more excellent storage performance, $R^3$ more preferably has from 1 to 20 carbon atoms, even more preferably from 8 to 20 carbon atoms, and particularly preferably from 13 to 20 carbon atoms. Examples of a monovalent hydrocarbon group having from 1 to 20 carbon atoms include: a straight-chain or branched alkyl group such as a methyl group, an ethyl group, an isopropyl group, a tert-butyl group, a hexyl group, a decyl group, a dodecyl group, a hexadecyl group, an octadecyl group, and an eicosyl group; and an alkenyl group such a vinyl group, an allyl group, a butene group, a pentene group, a hexene group, a heptene group, an octene group, a nonene group, a decene group, an undecene group, a dodecene group, a tridecene group, a tetradecene group, a pentadecene group, a hexadecene group, a heptadecene group, and an octadecene group. In Formula (B) described above, m represents an integer of 6 or greater. An upper limit value of m is not particularly limited, but m is generally not greater than 60.

Examples of such polyoxyethylene alkyl ether (HLB value) include: Noigen TDS-200D (16.3), Noigen TDS-500F (18.3), Noigen SD-110 (15.5), Noigen ET-189 (15.2) DKS-NL180 (16.1), DKS-NL250 (17.0), DKS-NL450F (18.2); and DKS-NL600F (18.6), all available from Dai-ichi Kogyo Seiyaku Co., Ltd.; EMULGEN 123P (15.3), EMULGEN 147 (16.3), EMULGEN 150 (18.4), EMULGEN 350 (17.8), EMULGEN 430 (16.2), EMULGEN 1118S-70 (16.4), EMULGEN 1135S-70 (17.9), EMULGEN 1150S-60

(18.5), and EMULGEN 4085 (18.9), all available from Kao Corporation; and NEWCOL2314 (15.1), NEWCOL2318 (16.0), NEWCOL2320 (16.4), NEWCOL2327 (17.2), NEWCOL2330 (17.5), NEWCOL2344 (18.2), NEWCOL2399-S (19.2), NEWCOLNT-15 (15.3), NEWCOLNT-20 (16.3), NEWCOLNT-30 (17.4), NEWCOLNT-40 (18), NEWCOLNT-50 (18.3), NEWCOL1020 (17.4), NEWCOL1860 (18.1), and NEWCOL3520-C (17.0), all available from Nippon Nyukazai Co., Ltd. Note that one type of the polyoxyethylene alkyl ether can be used alone, or two or more types thereof can be used in combination.

A content of the non-ionic surfactant in the tire puncture sealing agent of the present invention is not particularly limited, but in view of further improving sealing properties and storage performance, the content of the non-ionic surfactant is preferably from 1 to 60 parts by mass, more preferably from 3 to 40 parts by mass, and even more preferably from 3 to 20 parts by mass per total 100 parts by mass of the solid content of the rubber latex and the solid content of the resin emulsion.

Other Components

As necessary, the tire puncture sealing agent of the present invention may contain components other than the components described above as optional components. Examples of the optional components include a filler, an anti-aging agent, an antioxidant, a pigment (dye), a plasticizer, a thixotropic agent, a UV absorbent, a flame retardant, a dispersant, and an antistatic agent.

Method of Producing Tire Puncture Sealing Agent

A method of producing the tire puncture sealing agent of the present invention is not particularly limited, and an example of the method of producing the tire puncture sealing agent includes a method including mixing the respective components described above, and dispersing the components by using an agitator.

Method of Using Tire Puncture Sealing Agent

The tire puncture sealing agent of the present invention can be used to repair, for example, a punctured tire of an automobile. An example of the method of using the tire puncture sealing agent will be described below; however, the method of using the tire puncture sealing agent of the present invention is not limited to the following example.

First, a part referred to as a valve core is removed from an inflation valve of a punctured tire, and then the tire puncture sealing agent of the present invention is injected into the tire through the inflation valve. In this case, an amount of the tire puncture sealing agent to be injected is not particularly limited, but a necessary amount of the tire puncture sealing agent varies according to a size of a tire, and is generally from 200 to 500 g. Subsequently, the valve core is replaced, and the tire is filled with air to reach a predetermined internal pressure, and then immediately rotated. Note that the tire is often rotated by driving the automobile. Then, the tire puncture sealing agent spreads in a tire interior, and at or near a puncture hole, the tire puncture sealing agent is sucked into the puncture hole by an air pressure differential between an inside and an outside of the tire, and receives large shear force. Dispersed particles in the tire puncture sealing agent is solidified by such shear force, and close the puncture hole. Note that the tire puncture sealing agent of the present invention can be applied not only to a tire of an automobile, but also to tires of a bicycle and of a motorcycle.

Tire Puncture Repair Kit

As long as a tire puncture repair kit includes the tire puncture sealing agent of the present invention, other constituent members and an aspect of the tire puncture repair kit of the present invention are not particularly limited, but for example, the tire puncture sealing agent of the present invention and other members necessary for tire puncture repair are packaged in the tire puncture repair kit of the present invention. Examples of such necessary members include a compressor, tools (such as a valve stem tool for removing a valve core), an injection nozzle, a spare part (such as a spare valve core), an instruction manual, work gloves, and speed-limiting seals.

EXAMPLES

The present invention will be described below in further detail based on examples. Materials, used amounts, proportions, details of processing, processing procedures and the like described in the following examples can be modified as appropriate without departing from the spirit of the present invention. Therefore, the scope of the present invention is not to be interpreted limitedly by the following examples.

Producing Tire Puncture Sealing Agents

Components listed in Table 1 described below were mixed to result in contents (parts by mass) shown in Table 1, and were dispersed by using an agitator to produce tire puncture sealing agents of examples and comparative examples. Note that, in Table 1, values in parentheses for a rubber latex and a resin emulsion indicate parts by mass of solid contents.

Storage Performance Evaluation 300 g of each of the tire puncture sealing agents produced according to the method described above was sealed in a repair fluid bottle available from Yokohama Rubber Co., Ltd., and stored in a thermohygrostatic chamber at a temperature of 70° C. and relative humidity of 70%. The tire puncture sealing agent was visually observed once ten days to confirm the presence and absence of generation of a film. Note that the film refers to a film formed on a surface layer of a liquid of the tire puncture sealing agent, and serves as an indicator suggesting that a coagulation product is generated in the tire puncture sealing agent. A period until the film is generated (storage performance) was evaluated and shown in Table 1. Note that storage performance of 40 days or more was considered as the range of practical use.

TABLE 1

| (Table 1) Part 1 | Example | | | | | | | | | |
|---|---|---|---|---|---|---|---|---|---|---|
| | 1 | 2 | 3 | 4 | 5 | 6 | 7 | 8 | 9 | 10 |
| Rubber latex | 83 (50) | 83 (50) | 83 (50) | 83 (50) | 83 (50) | 83 (50) | 83 (50) | 83 (50) | 83 (50) | 83 (50) |
| Resin emulsion | 100 (50) | 100 (50) | 100 (50) | 100 (50) | 100 (50) | 100 (50) | 100 (50) | 100 (50) | 100 (50) | 100 (50) |
| MTG | 100 | 50 | 300 | 25 | 600 | 100 | 100 | 100 | | |
| MDG | | | | | | | | | 100 | 50 |
| MG | | | | | | | | | | |
| EG | | | | | | | | | | |
| PG | | | | | | | | | | |
| Surfactant 1 | 3 | 3 | 3 | 3 | 3 | 1 | 20 | 40 | 3 | 3 |
| Surfactant 2 | | | | | | | | | | |

TABLE 1-continued

| (Table 1) Part 1 | Example 1 | 2 | 3 | 4 | 5 | 6 | 7 | 8 | 9 | 10 |
|---|---|---|---|---|---|---|---|---|---|---|
| Surfactant 3 | | | | | | | | | | |
| Surfactant 4 | | | | | | | | | | |
| Surfactant 5 | | | | | | | | | | |
| Surfactant 6 | | | | | | | | | | |
| Surfactant 7 | | | | | | | | | | |
| Storage performance | 120 | 150 | 100 | 150 | 100 | 90 | 150 | 150 | 130 | 160 |

TABLE 2

| (Table 1) Part 2 | Example 11 | 12 | 13 | 14 | 15 | 16 | 17 | 18 | 19 | 20 |
|---|---|---|---|---|---|---|---|---|---|---|
| Rubber latex | 83 (50) | 83 (50) | 83 (50) | 83 (50) | 83 (50) | 83 (50) | 83 (50) | 83 (50) | 83 (50) | 83 (50) |
| Resin emulsion | 100 (50) | 100 (50) | 100 (50) | 100 (50) | 100 (50) | 100 (50) | 100 (50) | 100 (50) | 100 (50) | 100 (50) |
| MTG | | 100 | 100 | 100 | 100 | 100 | 100 | | | |
| MDG | 300 | | | | | | | 100 | 100 | |
| MG | | | | | | | | | | 100 |
| EG | | | | | | | | | | |
| PG | | | | | | | | | | |
| Surfactant 1 | 3 | | | | | | | | | 3 |
| Surfactant 2 | | | | | | | | | | |
| Surfactant 3 | | 3 | | 1 | | 20 | | 3 | | |
| Surfactant 4 | | | | | | | | | | |
| Surfactant 5 | | | 3 | | 1 | | 20 | | 3 | |
| Surfactant 6 | | | | | | | | | | |
| Surfactant 7 | | | | | | | | | | |
| Storage performance | 120 | 70 | 70 | 50 | 60 | 120 | 130 | 70 | 70 | 90 |

TABLE 3

| (Table 1) Part 3 | Example 21 | 22 | Comparative Example 1 | 2 | 3 | 4 | 5 | 6 | 7 | 8 | 9 |
|---|---|---|---|---|---|---|---|---|---|---|---|
| Rubber latex | 83 (50) | 83 (50) | 83 (50) | 83 (50) | 83 (50) | 83 (50) | 83 (50) | 83 (50) | 83 (50) | 83 (50) | 83 (50) |
| Resin emulsion | 100 (50) | 100 (50) | 100 (50) | 100 (50) | 100 (50) | 100 (50) | 100 (50) | 100 (50) | 100 (50) | 100 (50) | 100 (50) |
| MTG | | | 100 | 50 | 300 | 100 | 100 | 100 | 100 | | |
| MDG | | | | | | | | | | | |
| MG | 100 | 100 | | | | | | | | | |
| EG | | | | | | | | | | 100 | |
| PG | | | | | | | | | | | 100 |
| Surfactant 1 | | | | | | | | | | 3 | 3 |
| Surfactant 2 | | | | | | | 3 | | | | |
| Surfactant 3 | 3 | | | | | | | | | | |
| Surfactant 4 | | | | | | | | | 3 | | |
| Surfactant 5 | | 3 | | | | | | | | | |
| Surfactant 6 | | | | | | | | 3 | | | |
| Surfactant 7 | | | 3 | 3 | 3 | | | | | | |
| Storage performance | 50 | 50 | 20 | 30 | 10 | 10 | 20 | 20 | 20 | 30 | 30 |

The details of the components listed in Table 1 are as follows.

Rubber latex: natural rubber latex (HYTEX-HA; solid content: 60 mass %; available from Fulflex (Nomura Trading Co., Ltd.))

Resin emulsion: ethylene-vinyl acetate-vinyl versatate copolymer emulsion (Sumikaflex 950HQ; solid content: 50 mass %; available from Sumika Chemtex Co., Ltd.)

MTG: triethylene glycol monomethyl ether (methyl triglycol; available from Nippon Nyukazai Co., Ltd.; corresponding to the glycol ether)

MDG: diethylene glycol monomethyl ether (methyl diglycol; available from Nippon Nyukazai Co., Ltd.; corresponding to the glycol ether)

MG: ethylene glycol monomethyl ether (methyl glycol, available from Nippon Nyukazai Co., Ltd.; corresponding to the glycol ether)

EG: ethylene glycol (available from Mitsubishi Chemical Corporation)

PG: propylene glycol (available from Adeka Corporation)

Surfactant 1: polyoxyethylene stearyl ether (HLB value: 18.1; NEWCOL 1860; available from Nippon Nyukazai Co., Ltd.; corresponding to the polyoxyethylene alkyl ether)

Surfactant 2: polyoxyethylene stearyl ether (HLB value: 13.9; EMULGEN 320P; available from Kao Corporation; corresponding to the polyoxyethylene alkyl ether)

Surfactant 3: polyoxyethylene lauryl ether (HLB value: 18.4; EMULGEN 150; available from Kao Corporation; corresponding to the polyoxyethylene alkyl ether)

Surfactant 4: polyoxyethylene oleyl ether (HLB value: 12.4; NEWCOL 1210; available from Nippon Nyukazai Co., Ltd.; corresponding to the polyoxyethylene alkyl ether)

Surfactant 5: polyoxyethylene alkyl ether (HLB value: 18.2; NEWCOL 2344; available from Nippon Nyukazai Co., Ltd.; corresponding to the polyoxyethylene alkyl ether)

Surfactant 6: polyoxyethylene alkyl ether (HLB value: 14.5; NEWCOL 2312; available from Nippon Nyukazai Co., Ltd.; corresponding to the polyoxyethylene alkyl ether)

Surfactant 7: alkyl sulfate ester (NEWCOL 290-A; available from Nippon Nyukazai Co., Ltd.; anionic surfactant)

From the results shown in Table 1, it is found that any of the tire puncture sealing agents of Examples 1 to 22 each containing the rubber latex and/or the resin emulsion, the predetermined glycol ether, and the non-ionic surfactant having an HLB value from 15 to 20 has excellent storage performance. On the other hand, it is found that any of the tire puncture sealing agents of Comparative Examples 1 to 9 each containing no predetermined glycol ether nor non-ionic surfactant having an HLB value from 15 to 20 has poor storage performance.

From comparison of Examples 1, 6, 7, and 8, it is found that Examples 1, 7, and 8 each containing 3 to 40 parts by mass of the predetermined non-ionic surfactant per total 100 parts by mass of the solid content of the rubber latex and the solid content of the resin emulsion have better storage performance.

From comparison of Examples 1 to 4, it is found that Examples 1, 2, and 4 each containing 25 to 100 parts by mass of the predetermined glycol ether per total 100 parts by mass of the solid content of the rubber latex and the solid content of the resin emulsion have better storage performance, and Examples 2 and 4 each containing 25 to 50 parts by mass of the predetermined glycol ether have even better storage performance.

From comparison of Examples 1, 9, and 20, it is found that Example 9 containing a diethylene glycol monomethyl ether has better storage performance.

From comparison of Example 1 and Examples 12 and 13, it is found that Example 1 containing surfactant 1 has better storage performance.

The invention claimed is:

1. A tire puncture sealing agent comprising:
   at least any of a rubber latex and a resin emulsion;
   a glycol ether represented by Formula (A); and
   a non-ionic surfactant represented by Formula (B) and having an HLB value from 15 to 20:

$R^1$—O—$(CH_2CH_2O)_n$—$R^2$ (A)

$R^3$—O—$(CH_2CH_2O)_m$—H (B)

where $R^1$ represents a monovalent aliphatic hydrocarbon group having from 1 to 5 carbon atoms, n represents an integer from 1 to 5, and $R^2$ represents an alkyl group or a hydrogen atom,
   where $R^3$ represents a monovalent aliphatic hydrocarbon group having from 8 to 20 carbon atoms, and m represents an integer of 6 or greater,
   and wherein said non-ionic surfactant is selected from the group consisting of polyoxyethylene stearyl ether, polyoxyethylene lauryl ether, and polyoxyethylene alkyl ethers.

2. The tire puncture sealing agent according to claim 1, wherein the tire puncture sealing agent comprises 1 to 60 parts by mass of the non-ionic surfactant per total 100 parts by mass of a solid content of the rubber latex and a solid content of the resin emulsion.

3. The tire puncture sealing agent according to claim 1, wherein, in Formula (A), $R^1$ has 1 carbon atom.

4. A tire puncture repair kit comprising the tire puncture sealing agent according to claim 1.

5. The tire puncture sealing agent according to claim 2, wherein, in Formula (A), $R^1$ has 1 carbon atom.

6. A tire puncture repair kit comprising the tire puncture sealing agent according to claim 2.

7. A tire puncture repair kit comprising the tire puncture sealing agent according to claim 3.

8. A tire puncture sealing agent comprising:
   a mixture of a rubber latex and a resin emulsion;
   at least one glycol ether selected from the group consisting of ethylene glycol monomethyl ether, diethylene glycol monomethyl ether and triethylene glycol monomethyl ether; and
   a non-ionic surfactant selected from the group consisting of polyoxyethylene stearyl ether, polyoxyethylene lauryl ether, and polyoxyethylene alkyl ethers having an HLB value from 15 to 20, said non-ionic surfactant having the formula $R^3$—O—$(CH_2CH_2O)_m$—H, where $R^3$ represents a monovalent aliphatic hydrocarbon group having from 8 to 20 carbon atoms, and m represents an integer of 6 or greater.

9. The tire puncture sealing agent of claim 8, wherein the nonionic surfactant is polyoxyethylene stearyl ether.

10. A tire puncture repair kit comprising the tire puncture sealing agent according to claim 8.

* * * * *